Patented Apr. 8, 1924.

1,490,020

UNITED STATES PATENT OFFICE.

CARL OECHSLIN, OF PARIS, FRANCE, ASSIGNOR TO ETABLISSEMENTS POULENC FRERES, OF PARIS, FRANCE.

PROCESS OF PREPARATION OF SOLUBLE DERIVATIVES OF DIOXYARSENOANILIN.

No Drawing. Application filed February 11, 1922. Serial No. 535,936.

*To all whom it may concern:*

Be it known that I, CARL OECHSLIN, a citizen of the Swiss Confederation, and resident of the Republic of France, residing at Paris, France, have invented certain new and useful Improvements in Processes of Preparation of Soluble Derivatives of Dioxyarsenoanilin, of which the following is a specification.

Up to the present time only two methods have been known for effecting the reaction of the aldehyde derivative of sulphoxylic acid upon dioxyarsenoanilin. In the first method, the sodium methoxysulphoxylate is caused to act upon the chlorhydrate of the base, and it is therefore essentially the free methoxysulphoxylic acid which acts upon the arsenical derivative. In the second process, heat is employed in order to obtain a reaction between amine in suspension and the methoxysulphoxylate of soda, but the presence of alkali is excluded. Aside from the foregoing, no other methods are known for obtaining a di-substituted derivative without the use of heat.

According to this invention, the soluble derivatives of dioxyarsenoanilin substituted by the sodium methoxysulphoxylate can be obtained without production of methoxysulphoxylic acid and without requiring the use of heat, this being carried out by causing the said salt of sodium to react upon amine in suspension in water in the presence of sodium carbonate, obtaining essentially the mono- or di-substituted derivative according to the quality of the sodium methoxysulphoxylate employed in the reaction.

*Example 1.*—To 36 grammes of dioxyarsenoanilin in suspension in 150 cc. water at 15° C. are added 12 gr. of sodium methoxysulphoxylate, the solution being made alkaline by sodium carbonate either solid or in solution. When agitated, the soluble state is obtained in a complete manner. The mono-substituted arsenical product can be separated either as a sodium salt by precipitation in alcohol after neutralizing by acetic acid, or in the state of free acid by acidification with hydrochloric acid.

*Example 2.*—To 36 gr. of dioxyarsenoanilin in 150 cc. water at 15° C. are added 25 gr. of sodium methoxysulphoxylate. The solution is rendered alkaline by sodium carbonate and the soluble state is obtained by agitating. The di-substituted arsenical product may be separated as in the first example.

Having now particularly described and ascertained the nature of my said invention, I declare that what I claim is:

1. The process of preparing soluble derivatives of dioxy arsenoanilin, which consists in reacting upon dioxyarsenoanilin in aqueous suspension with molecular quantities of sodium methoxysulphoxylate, in the presence of an alkali and without the aid of heat.

2. The process of preparing soluble mono and di-substituted derivatives of dioxy arsenoanilin, which consists in reacting upon dioxy arsenoanilin in aqueous suspension with selective molecular quantities of sodium methoxysulphoxylate, according to the grade of derivative desired, in the presence of an alkali and without the aid of heat.

CARL OECHSLIN.